(12) United States Patent
Peters et al.

(10) Patent No.: US 9,396,153 B2
(45) Date of Patent: Jul. 19, 2016

(54) DATA COMMUNICATION INTERFACE FOR AN AGRICULTURAL UTILITY VEHICLE

(75) Inventors: Ole Peters, Enkenbach-Alsenborn (DE); Thomas Floerchinger, Mannheim (DE); Martin Von Hoyningen-Huene, Weinheim (DE); Peter Pickel, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 374 days.

(21) Appl. No.: 14/007,463

(22) PCT Filed: Apr. 18, 2012

(86) PCT No.: PCT/EP2012/057072
§ 371 (c)(1),
(2), (4) Date: Sep. 25, 2013

(87) PCT Pub. No.: WO2012/143389
PCT Pub. Date: Oct. 26, 2012

(65) Prior Publication Data
US 2014/0047152 A1 Feb. 13, 2014

(30) Foreign Application Priority Data
Apr. 21, 2011 (DE) .......... 10 2011 007 914

(51) Int. Cl.
| | |
|---|---|
| G06F 13/20 | (2006.01) |
| G06F 13/40 | (2006.01) |
| A01B 59/00 | (2006.01) |
| A01B 79/00 | (2006.01) |
| G06F 13/38 | (2006.01) |
| H04L 29/08 | (2006.01) |

(Continued)

(52) U.S. Cl.
CPC ............ *G06F 13/4068* (2013.01); *A01B 59/00* (2013.01); *A01B 79/005* (2013.01); *G06F 13/385* (2013.01); *G06F 13/4022* (2013.01); *H04L 67/12* (2013.01); *H04L 2012/40215* (2013.01); *H04L 2012/40273* (2013.01)

(58) Field of Classification Search
CPC .......... G06F 13/20; G06F 13/00; H04L 12/28
USPC ................... 710/305–306, 313, 316; 370/352
See application file for complete search history.

(56) References Cited

U.S. PATENT DOCUMENTS

| | | | | |
|---|---|---|---|---|
| 7,478,174 B2* | 1/2009 | Ellerbrock et al. | ........... | 709/251 |
| 7,627,707 B2* | 12/2009 | Watanabe | ..................... | 710/300 |

(Continued)

FOREIGN PATENT DOCUMENTS

| | | |
|---|---|---|
| DE | 19804740 A1 | 8/1999 |
| DE | 10225888 A1 | 6/2007 |

(Continued)

*Primary Examiner* — Christopher Shin

(57) ABSTRACT

A data communication interface for an agricultural utility vehicle, particularly an agricultural tractor, having an interface connector that can be connected either to a first data communication network or to a second data communication network by means of an electrically operatable changeover device, wherein the first data communication network is terminated at a line end associated with the interface connector by means of a disconnectable terminating resistor, and having a control unit that connects the interface connector to the first data communication network by means of appropriate operating of the changeover device exclusively when it infers the presence of a control signal that is provided for disconnecting the terminating resistor.

7 Claims, 3 Drawing Sheets

Figure 1:
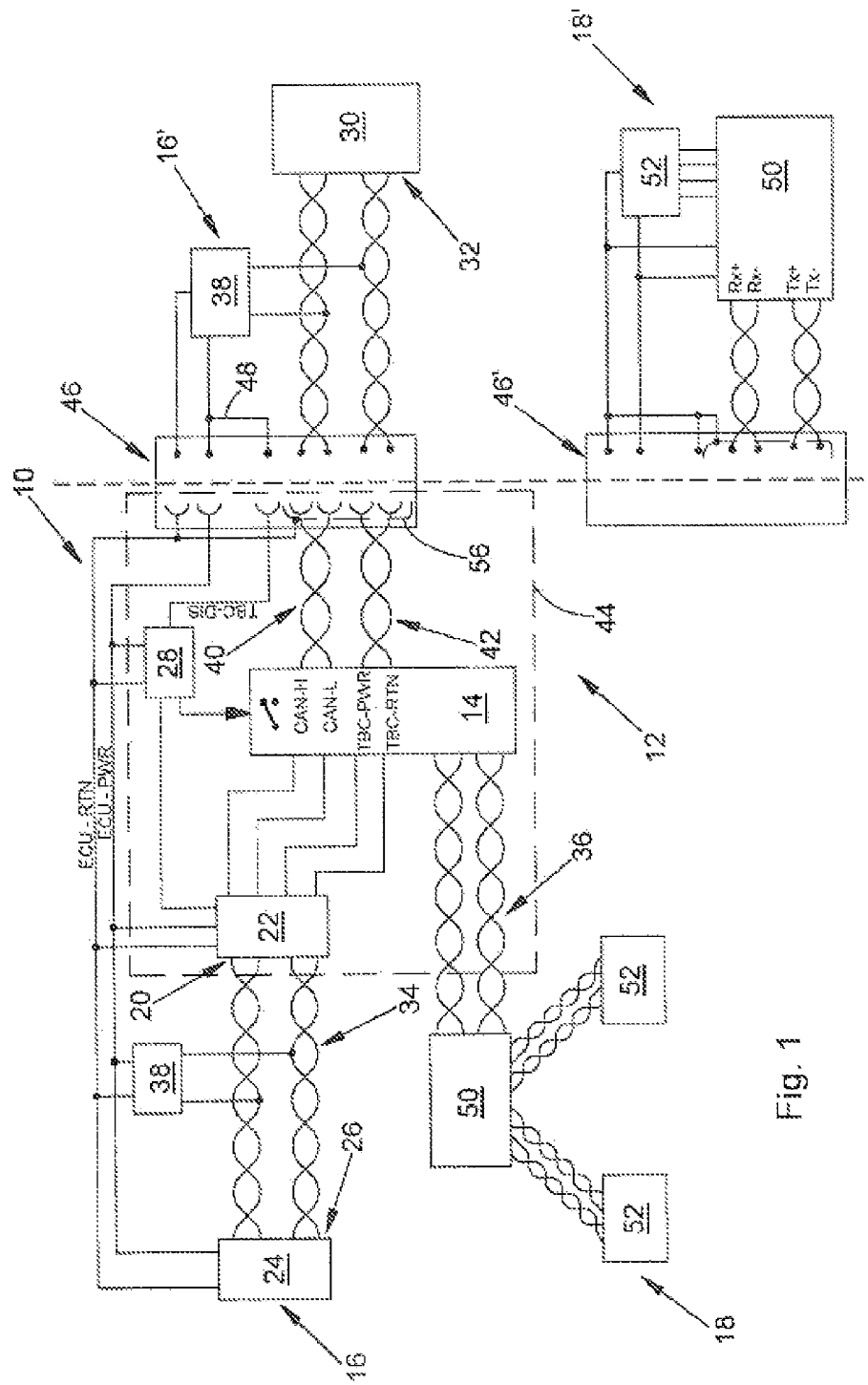

(51) Int. Cl.
  *H04L 12/28* (2006.01)
  *H04L 12/40* (2006.01)

(56) References Cited

U.S. PATENT DOCUMENTS

| | | | |
|---|---|---|---|
| 7,715,433 B2 * | 5/2010 | Boren | 370/466 |
| 7,855,573 B1 | 12/2010 | Yost | |
| 8,589,139 B2 * | 11/2013 | Mohr et al. | 703/14 |
| 8,597,054 B2 * | 12/2013 | Dozier et al. | 439/620.04 |
| 8,648,500 B1 * | 2/2014 | Jenkins et al. | 307/112 |
| 8,751,707 B2 * | 6/2014 | Moench et al. | 710/63 |
| 8,782,390 B2 * | 7/2014 | Haaf | 713/100 |
| 8,793,034 B2 * | 7/2014 | Ricci | 701/1 |
| 8,930,066 B2 * | 1/2015 | McKee et al. | 701/33.2 |
| 8,989,954 B1 * | 3/2015 | Addepalli et al. | 701/32.3 |
| 9,020,771 B1 * | 4/2015 | Hardy | 702/61 |
| 9,026,711 B2 * | 5/2015 | Kessler | 710/305 |
| 9,030,040 B2 * | 5/2015 | Tarasinski et al. | 307/9.1 |
| 2003/0090152 A1 | 5/2003 | Juntunen et al. | |
| 2008/0013569 A1 | 1/2008 | Boren | |

FOREIGN PATENT DOCUMENTS

| | | |
|---|---|---|
| DE | 112006002894 T5 | 9/2008 |
| DE | 102007024644 A1 | 11/2008 |
| EP | 1997686 A2 | 9/2011 |
| WO | 9114989 A1 | 10/1991 |

* cited by examiner

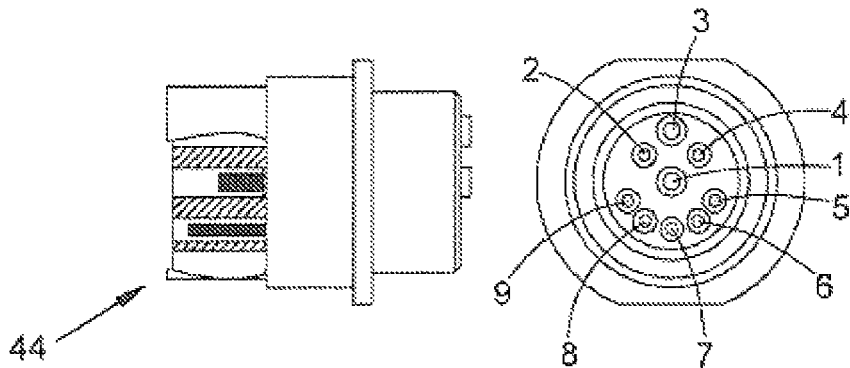

| Pin | Name | Function |
|---|---|---|
| 1 | GND | Ground connection for all the main loads of the agricultural utility vehicle and the accessory equipment |
| 2 | ECU_RTN | DC-isolated ground connection for all the electronic controllers of the accessory equipment |
| 3 | PWR | Power supply connection for all the main loads of the agricultural utility vehicle and of the accessory equipment |
| 4 | ECU_PWR | Power supply connection for all the electronic controllers of the accessory equipment (6-16 Vdc) |
| 5 | TBC_DIS | Control pin for disconnecting the terminating bias circuit associated with the IBBC |
| 6 | TBC_PWR | Power supply connection for the terminating bias circuit (TBC) of the accessory equipment |
| 7 | TBC_RTN | Ground connection for the terminating bias circuit (TBC) of the accessory equipment |
| 8 | CAN_H | Data pin for positive CAN difference signal |
| 9 | CAN_L | Data pin for negative CAN difference signal |

Fig. 3

DATA COMMUNICATION INTERFACE FOR AN AGRICULTURAL UTILITY VEHICLE

The invention relates to a data communication interface for an agricultural utility vehicle, particularly an agricultural tractor.

Modern agricultural utility vehicles usually have a vehicle-internal data communication network for networking various controllers. In this context, in the case of agricultural tractors, it is possible to identify an increasing tendency to extend the vehicle-internal data communication network to electrically controllable accessory equipment that can be attached to the agricultural tractor. This allows automated performance of recurring work steps by means of appropriate control of the accessory equipment. Thus, by way of example, DE 10 2005 029 405 A1 reveals a combination of an agricultural tractor and a baler in which the speed of travel of the agricultural tractor is adapted by means of a data communication link formed between the agricultural tractor and the baler on the basis of a harvest flow rate that is captured by sensor on the baler.

In this case, the network section associated with the accessory equipment is connected to the agricultural tractor by means of an interface connector—besides various power supply lines. In this case, different accessory equipment generally requires different types of data communication networks and hence interface connectors depending on the model and the level of technology.

It is therefore an object of the present invention to specify a data communication interface for an agricultural utility vehicle that allows the use of one and the same interface connector for different types of data communication networks.

This object is achieved by a data communication interface having the features of patent claim 1.

The data communication interface for an agricultural utility vehicle, particularly an agricultural tractor, comprises an interface connector that can be connected either to a first data communication network or to a second data communication network by means of an electrically operatable changeover device, wherein the first data communication network is terminated at a line end associated with the interface connector by means of a disconnectable terminating resistor. Furthermore, the data communication interface comprises a control unit that connects the interface connector to the first data communication network by means of appropriate operating of the changeover device exclusively when it infers the presence of a control signal that is provided for disconnecting the terminating resistor.

In other words, the interface connector can be used to provide not only a first data communication network, which needs to be terminated by means of a terminating resistor in order to avoid undesirable line reflections, but also at least one further second data communication network, which does not necessitate disconnection of the terminating resistor.

The terminating resistor is preferably incorporated in a shared housing of the interface connector with the changeover device and the control unit. The changeover device is in the form of a semiconductor switch or the like. Alternatively, the use of an electromechanical switch is also conceivable.

The two data communication networks can be extended externally by means of the shared interface connectors. By way of example, the external extension can be used to operate a piece of accessory equipment that is equipped with an appropriate network section. When the additional network section of the accessory equipment is connected to the interface connector, the terminating resistor associated with the interface connector needs to be disconnected in the case of the first data communication network. The termination then needs to be made using a terminating resistor associated with the additional network section. Consequently, the presence of the control signal and also the accompanying termination of the terminating resistor are reliable advice of the desire to provide the first data communication network. In all other cases, the changeover device remains in its unoperated initial position and connects the interface connector to the second data communication network.

The dual data communication interface formed in this manner allows the use of one and the same interface connector both for the first and for the second data communication network.

Advantageous developments of the data communication interface according to the invention emerge from the sub-claims.

Preferably, the first data communication network is a CAN data bus and the second data communication network is an Ethernet data network.

The CAN data bus is in particular in the form of a linear bus in the case of which a multiplicity of different controllers for monitoring and controlling operating functions of the agricultural utility vehicle and of a piece of accessory equipment fitted thereto can be connected to a central data line in parallel. To avoid undesirable line reflections, a terminating resistor having a value in the order of magnitude of 120 ohms is provided at both line ends.

By way of example, the CAN data bus is in the form of an ISOBUS according to the ISO 11783 standard. The ISO 11783 standard specifies a serial data communication network for controlling agricultural and silvicultural utility vehicles, including associated ISOBUS-based accessory equipment. The serial data communication network comprises two unshielded twisted pair conductor pairs in the form of a twisted quad cable, the first twisted pair conductor pair being used for the actual data transmission and the second twisted pair conductor pair being used for supplying power to the terminating resistors in a form of active resistor circuits or terminating bias circuits (TBC). In this case, the data are transmitted via the first twisted pair conductor pair at a data transmission rate of 250 kbit/s.

In addition, the Ethernet data network may be designed on the basis of the Internet Protocol or as a realtime Ethernet. On the basis of the ISO model, a distinction is possible by means of suitable evaluation of the data link layer. In this respect, a further division of the second data communication network is conceivable at the software level.

Furthermore, it is conceivable for the interface connector to be in the form of an Implement BUS Breakaway Connector (IBBC) according to the ISO 11783-2 standard. The Implement BUS Breakaway connector, which is typically fitted in the rear area of the agricultural utility vehicle, allows connection and operation of all the ISOBUS-based accessory equipment and comprises not only various data transmission and control pins but also a multiplicity of power supply and ground connections.

For the requirements of the present invention, the following pins or the connections of the Implement BUS Breakaway Connector are of significance, the abbreviations used being taken from the ISO 11783-2 standard:

| ECU_PWR | Power supply connection for all the electronic controllers of the accessory equipment (6-16 Vdc) |
|---|---|

| | |
|---|---|
| ECU_RTN | DC-isolated ground connection for all the electronic controllers of the accessory equipment |
| TBC_DIS | Control pin for disconnecting the terminating bias circuit associated with the IBBC |
| TBC_PWR | Power supply connection for the terminating bias circuit (TBC) of the accessory equipment |
| TBC_RTN | Ground connection for the terminating bias circuit (TBC) of the accessory equipment |
| CAN_H | Data pin for positive CAN difference signal |
| CAN_L | Data pin for negative CAN difference signal |

The ISO 11783-2 standard provides for the control pin TBC_DIS to have to be connected to the power supply connection ECU_PWR in order to disconnect the terminating resistor or terminating bias circuit associated with the Implement BUS Breakaway Connector. The accessory equipment interface coupling that needs to be connected to the interface connector when the accessory equipment is attached has an appropriate internal jumper to this end.

From the presence of the DC voltage ECU_PWR on the control pin TBC_DIS of the interface connector, it is therefore immediately possible to infer that ISOBUS operation of a piece of accessory equipment connected to the agricultural utility vehicle is intended. Advantageously, the DC voltage ECU_PWR that is present on the control pin TBC_DIS of the interface connector is therefore interpreted by the control unit as a control signal for operating the changeover device. The control unit connects the Implement BUS Breakaway Connector to the first data communication network, in the form of an ISOBUS, by operating the changeover device exclusively when this control signal is applied.

In all other cases, the changeover device remains in its unoperated initial position and connects the Implement BUS Breakaway Connector to the second data communication network.

If the second data communication network is in the form of an Ethernet data network, all four conductors of the twisted quad cable can be used for the purpose of data transmission, which allows the use of a shielded 4-wire 100BASE_TX Ethernet data network at a data transmission rate of 100 Mbit/s. By contrast, it may also be any other Ethernet data network, however. In this connection, particular mention is given to unshielded two-wire Ethernet data networks at a data transmission rate of 100 Mbit/s that are based on the IEEE standard 802.3 100Base_T2, or comparable data networks of this type.

By way of example, in the case of a 100BASE_TX or 100BASE_T2 Ethernet data network, the following line association can be made:

| ISOBUS | Ethernet 100BASE_TX | Ethernet 100BASE_T2 |
|---|---|---|
| CAN_H | RX+ | ETH+ |
| CAN_L | RX− | ETH− |
| TBC_PWR | TX+ | — |
| TBC_RTN | TX− | — |

Figure 2:
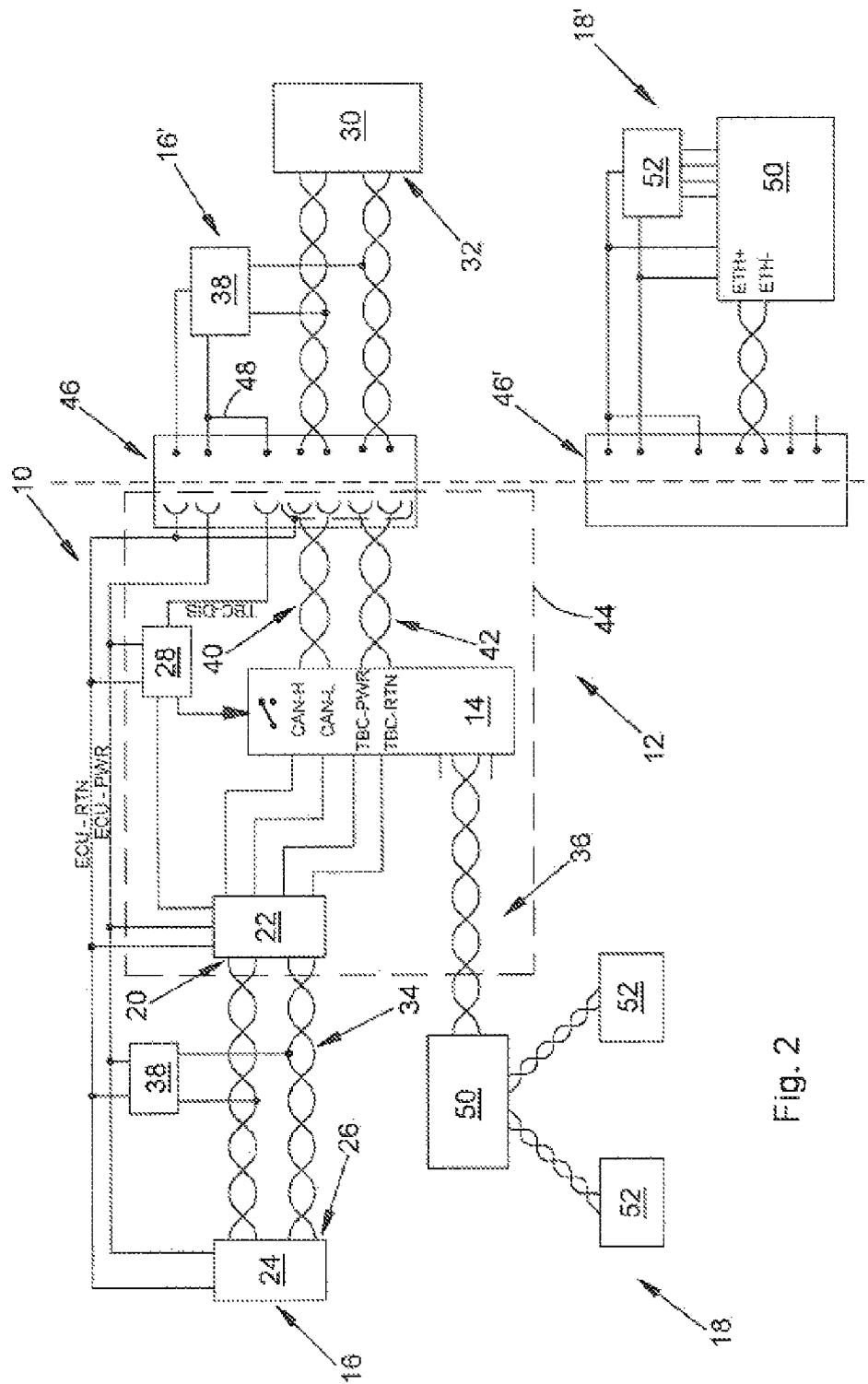

The data communication interface according to the invention is explained in more detail below with reference to the appended drawings. In the drawings, components that match in terms of their function or that are comparable are denoted by the same reference symbols, and:

FIG. 1 shows a first exemplary embodiment of the inventive data communication interface for an agricultural utility vehicle, FIG. 2 shows a second exemplary embodiment of the inventive data communication interface for an agricultural utility vehicle, and FIG. 3 shows an interface connector, in the form of an Implement BUS Breakaway Connector (IBBC), for use in a data communication interface according to the invention.

FIG. 1 shows a first exemplary embodiment of the inventive data communication interface for an agricultural utility vehicle. The agricultural utility vehicle is an agricultural tractor having a piece of accessory equipment that can be attached thereto.

The data communication interface 10 arranged in the agricultural tractor comprises an interface connector 12 that can be connected either to a first data communication network 16 or to a second data communication network 18 by means of an electrically operatable changeover device 14.

To avoid undesirable line reflections, the first data communication network 16 is terminated by means of a disconnectable first terminating resistor 22 at a first line end 20 associated with the interface connector 12. A second terminating resistor 24 is provided at an opposite second line end 26 of the first data communication network 16. The two terminating resistors 22 and 24 each have a value in the order of magnitude of 120 ohms.

Furthermore, the data communication interface 10 comprises a control unit 28 that connects the interface connector 12 to the first data communication network 16 by means of appropriate operating of the changeover device 14 exclusively when it infers the presence of a control signal that is provided for disconnecting the first terminating resistor 22.

The first terminating resistor 22 is incorporated in a shared housing of the interface connector 12 with the changeover device 14 in the form of a semiconductor switch and the control unit 28.

The two data communication networks 16 and 18 can be extended externally by means of the shared interface connectors 12. By way of example, the external extension can be used to operate a piece of accessory equipment that is equipped with an appropriate network section 16' or 18'. When the additional network section 16' or 18' of the accessory equipment is connected to the interface connector 12, the first terminating resistor 22 associated with the interface connector 12 needs to be disconnected in the case of the first data communication network 16. The termination then needs to be made using a third terminating resistor 30 associated with the additional network section 16'. Said terminating resistor is provided at a third line end 32 of the additional network section 16'. Consequently, the presence of the control signal and also the accompanying termination of the first terminating resistor 22 are reliable advice of the desire to provide the first data communication network 16. In all other cases, the changeover device 14 remains in its unoperated initial position and connects the interface connector 12 to the second data communication network 18.

By way of example, the first data communication network is a CAN data bus 34 and the second data communication network 18 is an Ethernet data network 36.

The CAN data bus 34 is in the form of a linear bus in the case of which a multiplicity of different controllers 38 for monitoring and controlling operating functions of the agricultural tractor and of a piece of accessory equipment attached thereto can be connected to a central data line in parallel.

To be more precise, the CAN data bus 34 is in the form of an ISOBUS according to the ISO 11783 standard. The ISO 11783 standard specifies a serial data communication network for controlling agricultural and silvicultural utility vehicles, including associated ISOBUS-based accessory equipment. The serial data communication network comprises two unshielded twisted pair conductor pairs 40 and 42 in the form of a twisted quad cable, the first twisted pair conductor pair 40 being used for the actual data transmission and the second twisted pair conductor pair 42 being used for supplying power to the terminating resistors 22, 24 and 30 in the form of active resistor circuits or terminating bias circuits (TBC). In this case, the data are transmitted via the first twisted pair conductor pair 44 at a data transmission rate of 250 kbit/s.

The Ethernet data network 36 is designed on the basis of the Internet Protocol or as a realtime Ethernet. On the basis of the OSI model it is possible for the control unit 28 to make a distinction by means of suitable evaluation of the data link layer. In this respect, the second data communication network 18 is divided further at the software level.

In line with the example, the interface connector 12 is in the form of an Implement BUS Breakaway Connector 44 according to the ISO 11783-2 standard, the design of which is illustrated in FIG. 3 along with the associated pin or connecting assignment. The Implement Bus Breakaway Connector 44 mounted in the rear area of the agricultural tractor allows connection and operation of all the ISOBUS-based accessory equipment and comprises not only various data transmission or control pins but also a multiplicity of power supply and ground connections.

For the requirements of the present invention, the following pins or the connections of the Implement BUS Breakaway Connector 44 are of significance, the abbreviations used being taken from the ISO 11783-2 standard:

| | |
|---|---|
| ECU_PWR | Power supply connection for all the electronic controllers of the accessory equipment (6-16 Vdc) |
| ECU_RTN | DC-isolated ground connection for all the electronic controllers of the accessory equipment |
| TBC_DIS | Control pin for disconnecting the terminating bias circuit associated with the IBBC |
| TBC_PWR | Power supply connection for the terminating bias circuit (TBC) of the accessory equipment |
| TBC_RTN | Ground connection for the terminating bias circuit (TBC) of the accessory equipment |
| CAN_H | Data pin for positive CAN difference signal |
| CAN_L | Data pin for negative CAN difference signal |

The ISO 11783-2 standard provides for the control pin TBC_DIS to have to be connected to the power supply connection ECU_PWR in order to disconnect the first terminating resistor 22 or terminating bias circuit associated with the Implement BUS Breakaway Connector 44. The accessory equipment interface coupling 46 that needs to be connected to the interface connector 12 when the accessory equipment is attached has an appropriate internal jumper 48 to this end.

From the presence of the DC voltage ECU_PWR on the control pin TBC_DIS of the interface connector 12, it is therefore immediately possible to infer that ISOBUS operation of a piece of accessory equipment connected to the agricultural tractor is intended. The DC voltage ECU_PWR that is present on the control pin TBC_DIS of the interface connector 12 is therefore interpreted by the control unit 28 as a control signal for operating the changeover device 14. The control unit 28 connects the Implement BUS Breakaway Connector 44 to the first data communication network 16, in the form of an ISOBUS, by operating the changeover device 14 exclusively when this control signal is applied.

In all other cases, the changeover device 14 remains in its unoperated initial position and connects the Implement BUS Breakaway Connector 44 to the second data communication network 18, in the form of an Ethernet data network 36, the basic design of which is illustrated in FIG. 1 by central Ethernet switches 50 and a plurality of controllers 52 connected thereto.

By way of example, all four available conductors of the twisted quad cable are used for the purpose of data transmission, and in the present case a four-wire shielded 100BASE_TX Ethernet data network 36 at a data transmission rate of 100 Mbit/s is used. In order to ensure the demanded compliance with the EMC guideline, additional shielding 56 or 56' of the control pins TBC_PWR, CAN_H, CAN_L and TBC_RTN of the interface connector 12 and of the associated interface coupling 46' of the accessory equipment is provided.

FIG. 2 shows a second exemplary embodiment of the inventive data communication interface for an agricultural utility vehicle. This exemplary embodiment differs from the first exemplary embodiment, shown in FIG. 1, in terms of the form of the second data communication network 18 as an unshielded two-wire 100Base-T2 Ethernet data network 36 at a data transmission rate of 100 Mbit/s. In this case, only two of the total of four available conductors of the twisted quad cable are used for the purpose of data transmission. Additional shielding of the interface connector 12 can be dispensed with in this case.

The invention claimed is:

1. A data communication interface system for connecting an agricultural utility vehicle to an implement that can be attached to the agricultural utility vehicle, the system comprising:
   a vehicle CAN bus network on the agricultural utility vehicle;
   a vehicle Ethernet network on the agricultural utility vehicle;
   an interface connector that can be connected to an implement CAN coupling of an implement CAN data bus network and can be connected to an implement Ethernet coupling of an implement Ethernet network, the interface connector connectable at one time to the implement CAN coupling or the implement Ethernet coupling;
   an electrically operatable changeover device connected to the interface connector, the changeover device connected to the vehicle CAN bus network and the vehicle Ethernet network; and
   a housing that houses the interface connector and the changeover device, the housing on the agricultural utility vehicle;
   wherein the implement CAN coupling includes a control pin that provides a control signal to the changeover device through the interface connector when the implement CAN coupling is connected to the interface connector;
   wherein the changeover device connects the vehicle CAN bus network to the interface connector when the control signal is provided to the changeover device via the implement CAN coupling and otherwise connects the vehicle Ethernet network to the interface connector.

2. The data communication interface as claimed in claim 1, wherein the CAN data bus is in the form of an ISOBUS according to the ISO 11783 standard.

3. The data communication interface as claimed in claim 1, wherein the Ethernet data network is designed on the basis of the Internet Protocol or as a realtime Ethernet.

4. The data communication interface as claimed in claim 2, wherein the interface connector is in the form of an Implement BUS Breakaway Connector according to the ISO 11783-2 standard.

5. The data communication interface as claimed in claim 3, wherein the interface connector is in the form of an Implement BUS Breakaway Connector according to the ISO 11783-2 standard.

6. The data communication interface as claimed in claim 1, wherein the control signal is the DC voltage ECU_PWR.

7. The data communication interface as claimed in claim 6, wherein the implement CAN coupling includes a jumper connected to the control pin.

* * * * *